(12) United States Patent
Brabec et al.

(10) Patent No.: US 10,417,692 B2
(45) Date of Patent: *Sep. 17, 2019

(54) RECOVERY OF E-COMMERCE ORDERS

(71) Applicant: T-Mobile USA, Inc., Bellevue, WA (US)

(72) Inventors: Jeremy J. Brabec, Redmond, WA (US); Chunhui Li, Mukilteo, WA (US); Toan Van Nguyen, Marietta, GA (US); Vipul M. Sagare, Irving, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/582,413

(22) Filed: Apr. 28, 2017

(65) Prior Publication Data

US 2017/0236192 A1      Aug. 17, 2017

Related U.S. Application Data

(63) Continuation of application No. 13/732,084, filed on Dec. 31, 2012, now Pat. No. 9,639,885.

(51) Int. Cl.
*G06Q 30/00* (2012.01)
*G06Q 30/06* (2012.01)

(52) U.S. Cl.
CPC ................. *G06Q 30/0635* (2013.01)

(58) Field of Classification Search
CPC .................................. G06Q 30/06–08

USPC ................................ 705/26.1–27.2
See application file for complete search history.

(56) References Cited

U.S. PATENT DOCUMENTS

| | | | | |
|---|---|---|---|---|
| 9,639,885 | B2* | 5/2017 | Brabec | G06Q 30/0635 |
| 2007/0282743 | A1* | 12/2007 | Lovelett | G06Q 20/10 |
| | | | | 705/40 |
| 2014/0188668 | A1 | 7/2014 | Brabec et al. | |

OTHER PUBLICATIONS

Office action for U.S. Appl. No. 13/732,084, dated Aug. 17, 2015, Brabec et al., "Recovery of E-Commerce Orders", 15 pages.
Office action for U.S. Appl. No. 13/732,084, dated Sep. 2, 2016, Brabec et al., "Recovery of E-Commerce Orders", 19 pages.

* cited by examiner

*Primary Examiner* — Ethan D Civan
(74) *Attorney, Agent, or Firm* — Lee & Hayes, P.C.

(57) ABSTRACT

Implementations for recovering e-commerce orders are described herein. An e-commerce order is submitted to an order processing system, by an order check-out module of an online transaction system. The e-commerce order includes order information that is provided to the order check-out module by a client device. The check-out module determines that the order processing is delayed or failed and, based at least on a status of the order processing being delayed or failed, initiates an order recovery action to be performed by an order recovery engine. Once the order recovery action is initiated, the order check-out module is made available to handle a new order.

20 Claims, 7 Drawing Sheets

RECOVERY OF E-COMMERCE ORDERS

CROSS REFERENCE TO RELATED APPLICATION

This patent application is a continuation of co-owned pending application, U.S. patent application Ser. No. 13/732,084, filed Dec. 31, 2012, entitled "RECOVERY OF E-COMMERCE ORDERS", which is hereby incorporated in its entirety by reference.

BACKGROUND

In online e-commerce, a user browses to an e-commerce website to choose one or more goods or services for purchase. Once the user selects items for purchase, the website provides a check-out path for the user to enter order information such as the shipping address, credit card information, purchaser's name, and so forth. The e-commerce website often does not handle the actual order processing, and instead submits the order to a back-end order processing system. If the order processing system is unavailable, or is delayed in processing the order, then the website check-out path may either be tied up waiting for the order to be processed by the back-end order processing system, or the order may be lost, resulting in lost revenue and lower customer satisfaction.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for recovering e-commerce orders when a back-end order processing system experiences delay or order processing failure. As noted above, in conventional online e-commerce transactions, an error or delay in the back-end order processing system results in lost orders, tied-up resources in the check-out system, or both. Embodiments of the present disclosure include an order recovery engine that operates to recover orders that are delayed or suffer failure on the back-end.

An e-commerce system according to embodiments detects order processing outages or delays, preserves orders in the case of delay or outage, and resubmits the orders at a later time using asynchronous (e.g., not real-time) queuing. Embodiments of the present disclosure maintain the appearance of a conventional synchronous e-commerce experience for the user by providing the user with near real-time response to submission of his or her orders, and by providing order details and/or instructions to return at a later time to check on the status of orders that have been delayed or are initially failed. Embodiments may also ask users whether they would like to be notified when their orders are completed.

Example Environment

Figure 1:
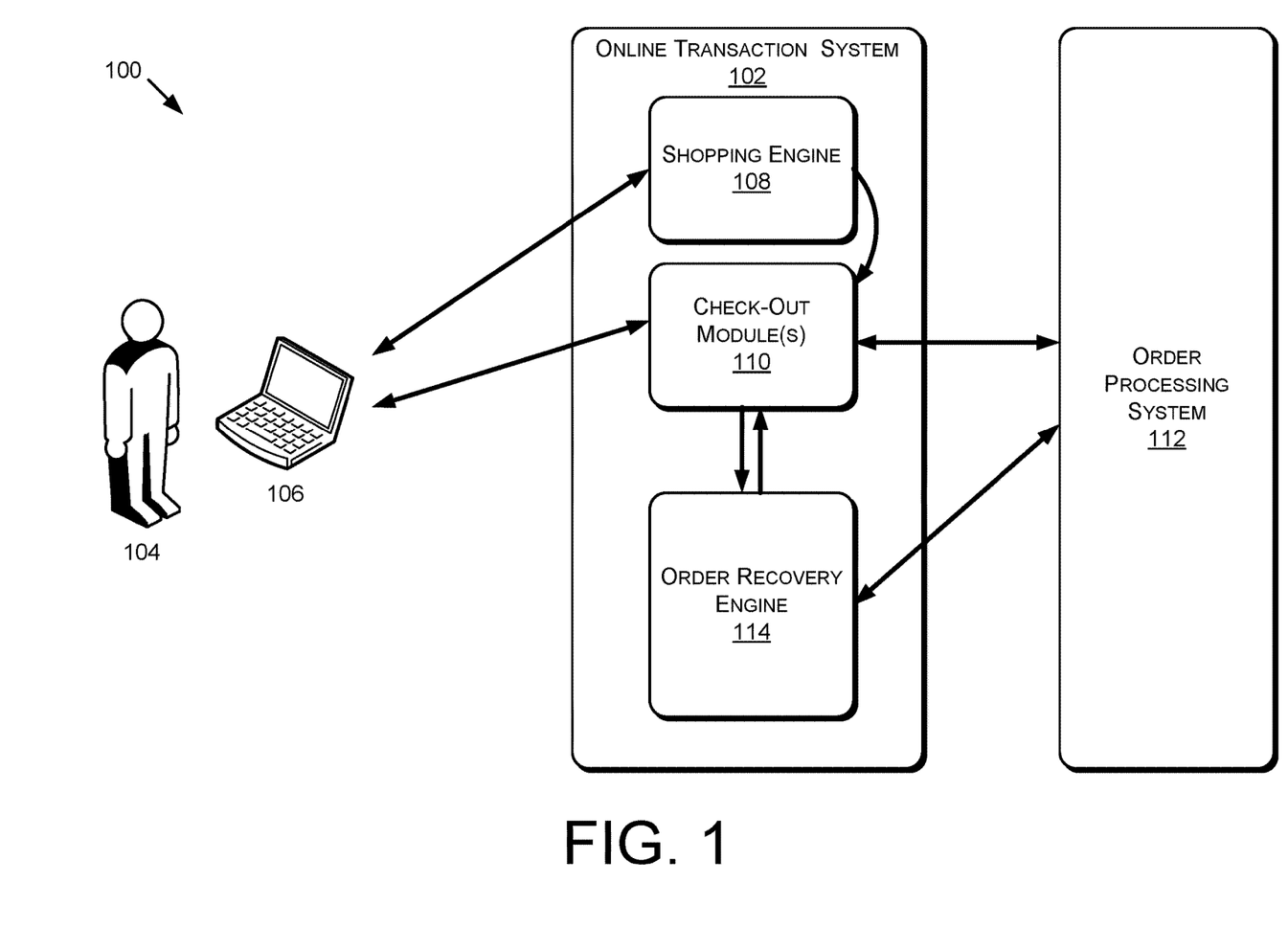
FIG. 1 illustrates an example environment for recovery of e-commerce orders.

FIG. 1 illustrates an example environment 100 for recovery of e-commerce orders. An online transaction system 102 provides an online shopping experience for a user 104, via client device 106. A shopping engine 108 provides the client device 106 with one or more user interfaces, software modules, and the like to provide an online shopping experience. For example, the shopping engine 108 may provide one or more hypertext markup language (HTML) or extensible markup language (XML) files, or other web-based files, such as JavaScript or AJAX (Asynchronous JavaScript) files, that collectively provide an online shopping experience on the client device 106, such as via a browser, stand-alone application, or the like. Although client device 106 is shown as a laptop computer, client device 106 may be a desktop computer, a mobile phone, a netbook, game console, or other device capable of downloading and displaying the various user interfaces provided by the shopping engine 108. The shopping engine 108 may include or be communicatively coupled to one or more databases of product details, such as product availability, prices, images, online reviews, text-based descriptions, video content, and so forth.

During the flow of the online shopping experience provided by the shopping engine 108, the user 104 may decide to make a purchase (such as by clicking or tapping on a check-out icon, or similar action). At that point, the shopping engine 108 redirects the client device 106 to a check-out module 110 to complete the order. The check-out module may implement a thread. The online transaction system 102 may launch multiple instances of a check-out module 110, or multiple threads, in order to simultaneously serve multiple users 104. The shopping engine 108 provides information about the order, such as goods or services selected by the user 104 for purchase, to the check-out module 110. The check-out module 110 receives other order information from the user 104 via the client device 106. The other order information includes purchaser name, shipping address, credit card information, and so forth, as is typical in conventional online e-commerce. The online check-out module 110 may perform an internal check on the order information provided by the user 104 to determine that the order information is complete and accurate, such as by running a credit card number check, ensuring that the address information is valid, and so forth. The online check-out module 110 then submits the order, including the order information, along with identifiers of the product(s) and service(s) being purchased, to an order processing system 112.

The order processing system 112 may be one of several back-end order processing systems known in the art, such as order processing systems from SAP AG or others. The order processing system 112 may include multiple components, such as multiple servers, which may be in one or more geographical locations. The check-out module 110 may communicate with the order processing system 112 using a protocol specification, such as Simple Object Access Protocol (SOAP) or other protocol specification for exchanging information.

The check-out module 110 submits the order to the order processing system 112 and determines whether the order is successfully completed, the order is delayed, or the order is failed. In the case where the order is successfully completed, the check-out module 110 updates an order database with the order information and provides the client device 106 with a message indicating that the order is complete, and may provide information such as an order number or other information regarding the order. In the case where the order is delayed, the check-out module 110 updates the order database to indicate a delayed order, and provides the client device 106 with a message that the order is pending and to check back later. In the event that the order is failed, the check-out module 110 updates the database to indicate a pending order, places the order, or a resubmission order, into an order resubmission queue of an order recovery engine 114, and provides the client device with a message that the order is pending and to check back later. A resubmission order includes all of the same order information as the original (but failed) order, but with a time-stamp or other information that may be used to route or prioritize the resubmission order.

As will be described in more detail below with respect to FIGS. 2A-D, the check-out module initiates—such as by updating the order database with the order information and/or by placing the order or resubmission order into the order resubmission queue—one or more order recovery actions to be taken by the order recovery engine 114. In a conventional e-commerce system, delay or failure would cause the order to be lost and/or tie up resources that could be used to handle the next order. By initiating one or more order recovery actions, embodiments of the present disclosure result in fewer lost orders in the event of order processing failure or delay.

The online transaction system 102 and the order processing system 112 may be implemented in any one or more computing devices, such as PCs, laptop computers, workstations, server systems, mainframes, server farms, or any other computing devices. The computing device(s) constituting the online transaction system 102 may also be connected by one or more networks, such as WANs, LANs, PANs, or the Internet and may utilize any sort of communication protocol known in the art for sending and receiving messages, such as TCP/IP, HTTP, or any other protocol. An example online transaction system 102 is illustrated in greater detail in FIG. 3 and is described in detail below with reference to that figure.

Example Transaction Flows

Figure 2A:
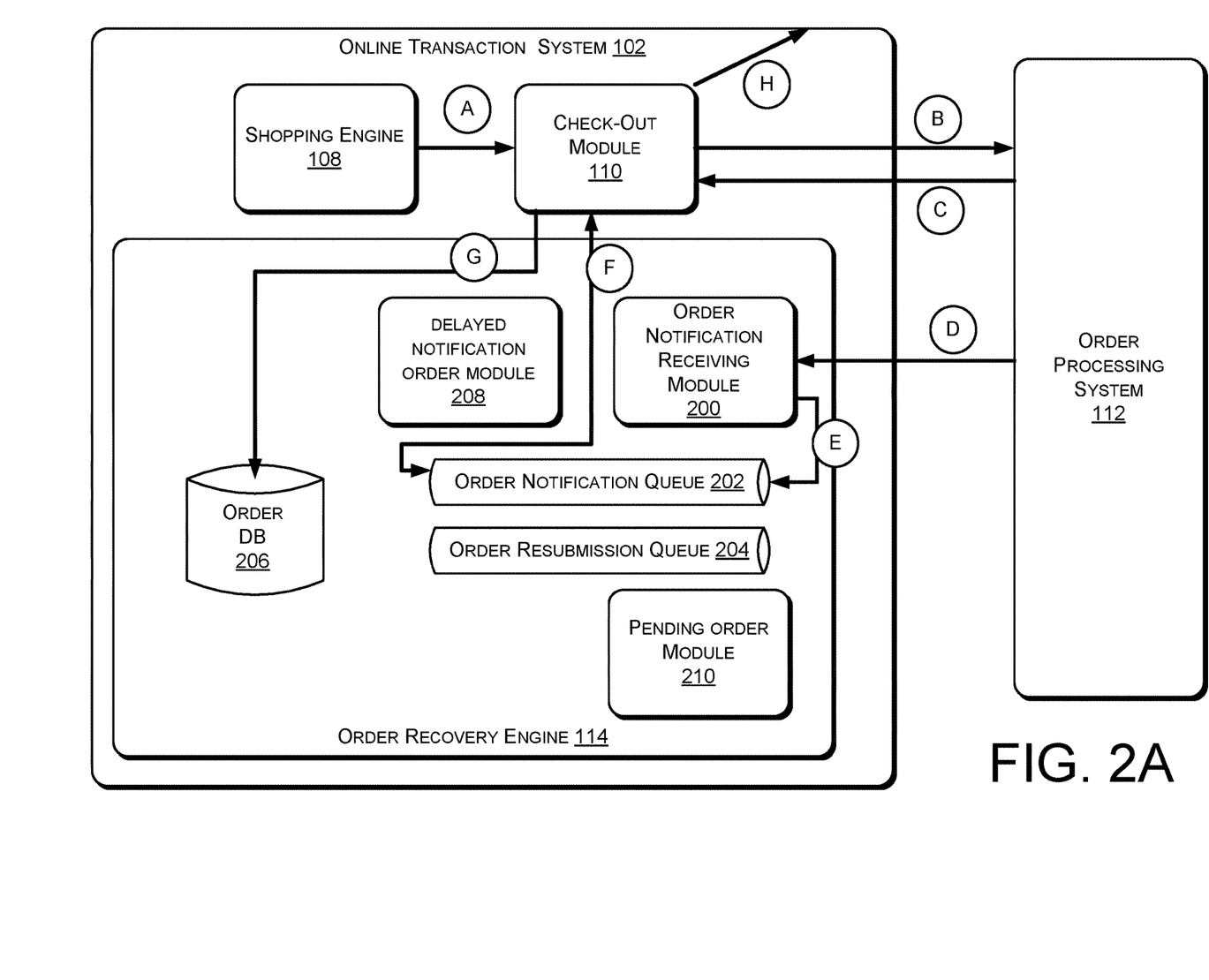
FIG. 2A illustrates a block diagram of an example online transaction system with an order recovery engine, along with a transaction flow for processing orders when the order processing system is operating normally.

FIG. 2A illustrates a block diagram of an example online transaction system 102 with an order recovery engine 114, along with a transaction flow for processing orders when the order processing system is operating normally. As described above, the shopping engine 108 redirects the user 104 to the check-out module 110 to submit a purchase order (denoted by A in FIG. 2). The check-out module 110 submits the order to the order processing system 112 (denoted by B in FIG. 2). When the order processing system 112 operates normally, it provides an order received acknowledgment to the check-out module 110 (denoted by C). The check-out module 110 correlates the acknowledgment with the submitted order message to determine that the order is acknowledged. As described in FIG. 2A, if the acknowledgment is not received, then the check-out module 110 places the order into the order resubmission queue 204.

Subsequently, when the order processing system 112 operates normally, it processes the order and provides a notification to the online transaction system 102 that the order processing is complete (denoted by D). In conventional e-commerce systems, the check-out module 110 may receive the order notification. But in various embodiments of the present disclosure, an order notification receiving module 200 listens for and receives the order notifications from the order processing system 112. The order notification receiving module 200 places the order notifications into the order notification queue 202. The check-out module 110 looks in the order notification queue 202 for a notification that its pending order is complete (denoted by F). Upon determining that a notification regarding its pending order in the order notification queue 202 indicates that the order is complete, the check-out module 110 updates an order database 206 with the order number, other order details, and an indication that the order is complete (denoted by G). The check-out module 110 transmits to the client device 106 a message indicating that the order is complete, and provides details such as an order number and other information (denoted by H). At this point, the check-out module 110 is made available to handle a new order.

Figure 2B:
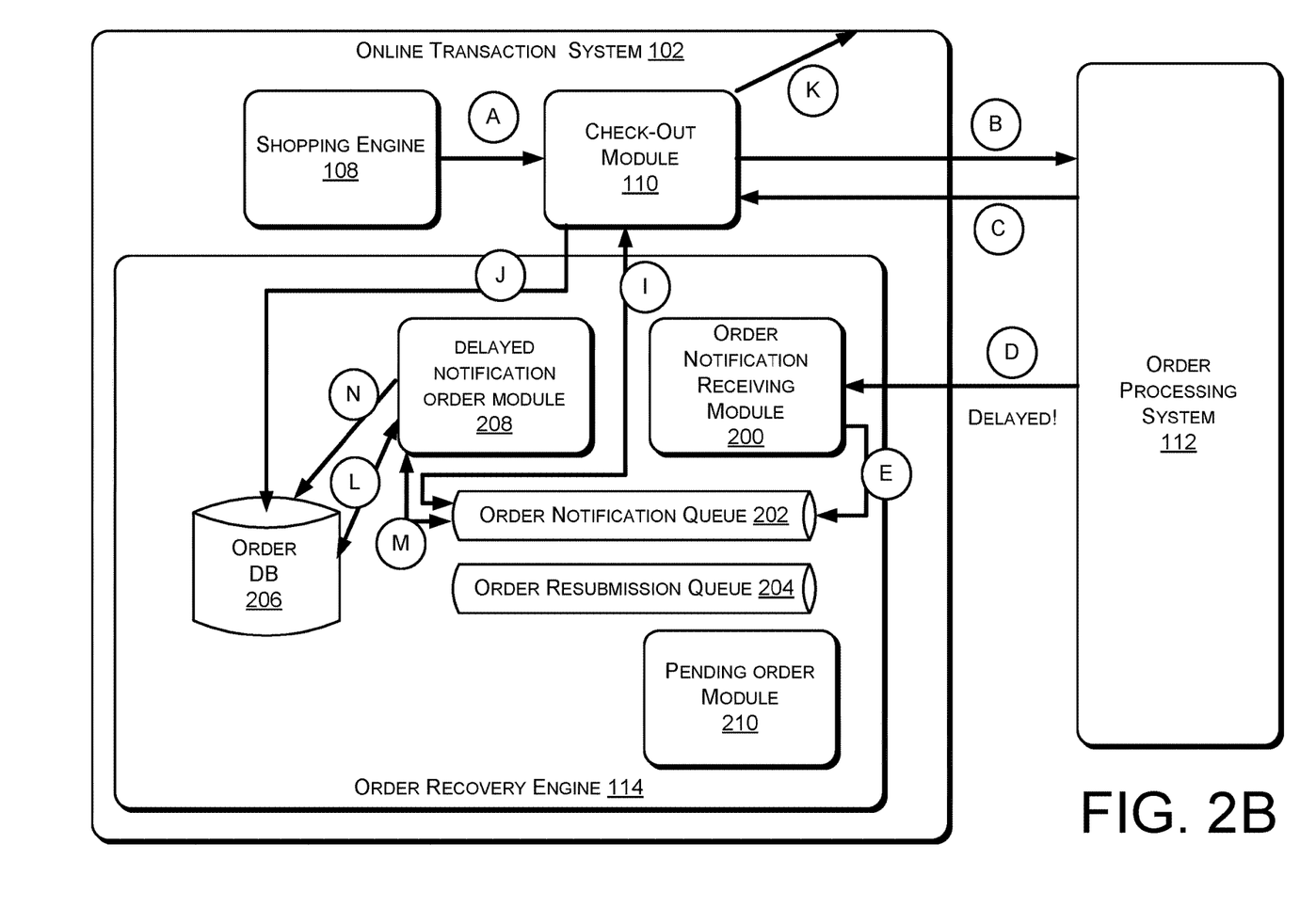
FIG. 2B illustrates a block diagram of an example online transaction system with an order recovery engine, along with a transaction flow for processing orders when the order processing system experiences delay.

FIG. 2B illustrates a block diagram of an example online transaction system 102 with an order recovery engine 114, along with a transaction flow for processing orders when the order processing system experiences delay. In the transaction flow illustrated in FIG. 2B, the transaction elements A-E are the same as in FIG. 2A. Because the check-out module 110 receives an order received acknowledgment from the order processing system (denoted by C), the check-out module 110 treats the order as not failed and looks to the order notification queue 202 for a notification regarding its pending order. But, unlike in FIG. 2A, the order processing system 112 is delayed in providing the order notification (denoted by D). Thus, when the check-out module 110 looks to the order notification queue 202 for the notification (denoted by I), such as after a configurable waiting period, it determines that the order notification is not present therein. The check-out module 110 then updates the order database 206 with the order, including an indication that the order processing is delayed. The check-out module also provides the client device 106 with a message indicating that the order is pending, and instructing the user 104 to check back later for additional information (denoted by K). The check-out module 110 then becomes available for handling additional orders.

The check-out module 110 makes several attempts, at pre-set or configurable intervals, to check the order notification queue 202 for a notification regarding its pending order before updating the order database 206 (J) and transmitting a message to the client device 106 (K). For example, the check-out module 110 may look to the order notification queue 202 at 5 s, 10 s, and 20 s after submitting the order (or receiving the order received acknowledgment) before marking the order as delayed in the order database 206.

The delayed notification order module 208 queries the order database 206 for one or more orders that are delayed (denoted by L), and looks to the order notification queue 202 to determine whether notifications regarding those orders are present (denoted by M). Upon determining that the order notifications are present in the order notification queue 202, the delayed notification order module 208 updates the order database 206 to indicate that the order is completed. At any later point, the user 104, upon returning to an order status webpage, can view that his or her "pending" order is now complete.

In conventional e-commerce systems, where an order notification is delayed, the check-out module 110 would either have to tie up resources waiting for the notification to return from the order processing system 112, or inform the user that their order is canceled. But the order recovery engine 114 enables the online transaction system 102 to free up the check-out module 110 to handle a new order without losing the order.

Figure 2C:
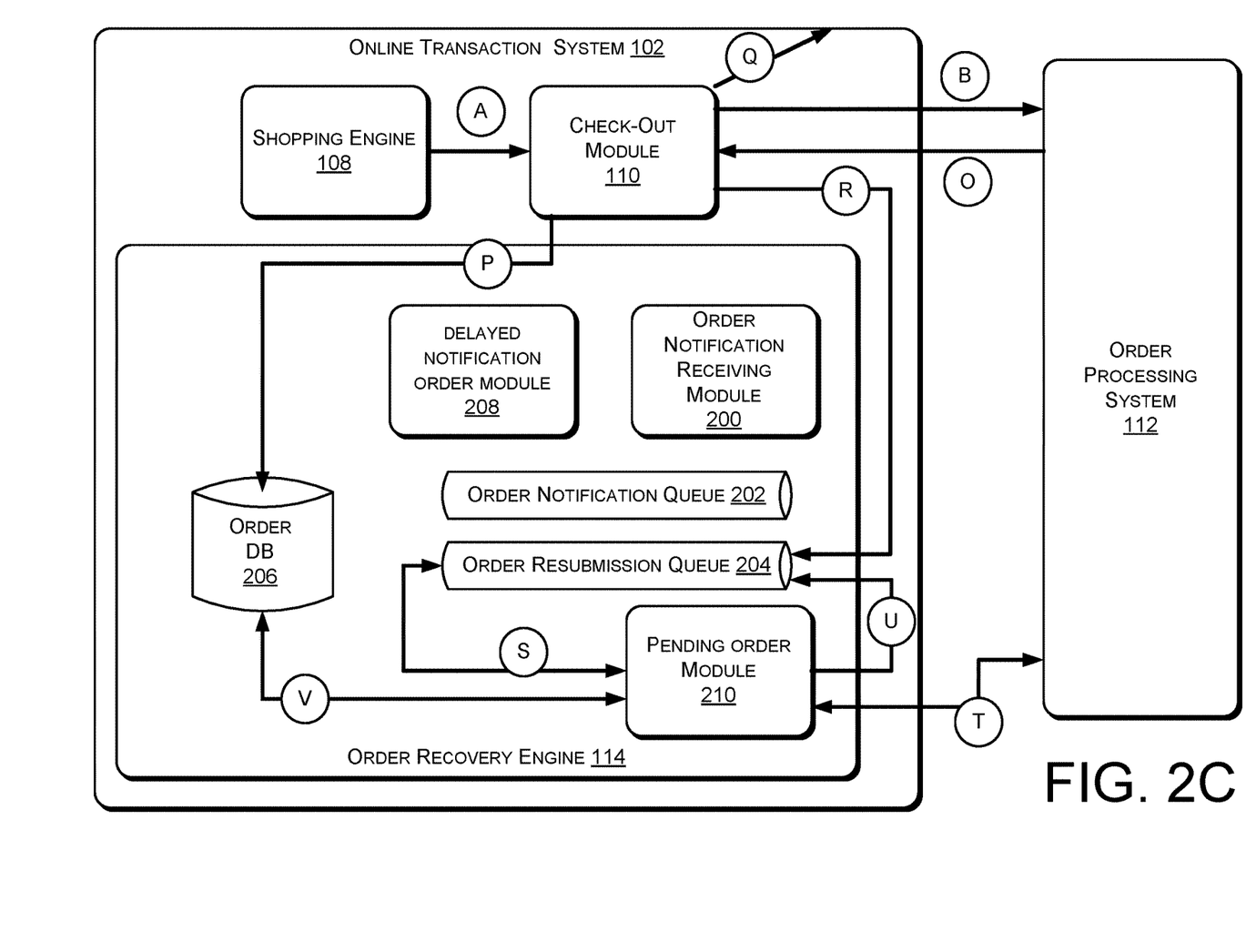
FIG. 2C illustrates a block diagram of an example online transaction system with an order recovery engine, along with a transaction flow for processing orders when the order processing system is offline or experiencing errors.

FIG. 2C illustrates a block diagram of an example online transaction system 102 with an order recovery engine 114, along with a transaction flow for processing orders when the order processing system is offline or experiencing errors. In the transaction flow illustrated in FIG. 2C, the shopping engine 108 redirects the user 104 to the check-out module (denoted by A) and the check-out module 110 submits the order to the order processing system 112 (denoted by B). But in this example transaction flow, the order processing system 112 is either offline, is in maintenance mode, or is experiencing errors such as system error, a network error, or some other error. Thus, the check-out module 110 either does not receive an order acknowledgment from the order processing system within a time-out period (such as, for example one to three minutes, and in particular two minutes, or some other time-out interval), or the order processing system 112 returns a message indicating an order processing error (such as a SOAP fault message) instead of an order acknowledgement message (denoted by O).

Upon determining that the order processing is failed—either because of a time-out waiting for the acknowledgement or because of receipt of an error message—the check out module 110 updates the order database 206 to reflect that the order processing is failed (denoted by P), places an order, or a resubmission order, into the order resubmission queue 204 (denoted by R), and transmits a message to the client device 106 informing the user 104 that the order processing is not complete, and instructing the user 104 to return later for updated information (denoted by Q). The check-out module 110 then makes itself available to handle a new order.

A pending order module 210 retrieves resubmission orders from the order resubmission queue 204, and re-submits them to the order processing system 112 (denoted by T). Upon determining that the order re-submission is a failure, the pending order module 210 places the order or resubmission order back into the order resubmission queue 204 (denoted by R). In embodiments that utilize a time-stamp on the resubmission orders in the order resubmission queue 204, the time-stamps may be used to determine an order or a priority for resubmitting the orders. The pending order module 210 may update the time-stamp when placing orders or resubmission orders back into the order resubmission queue 204. Upon determining that the order re-submission is a success, the order pending order module 210 updates the order database 206 to indicate that the order is complete (denoted by V).

The pending order module 210 may resubmit the orders in configurable dynamic intervals. In one example, the first retry is attempted after 4 hours (based on for example a time-stamp on the queued order). In this example, if the first retry is not successful, then the second retry is attempted after 8 hours, 10 hours, 12 hours or after at some other time period. Other resubmission intervals, dynamic and non-dynamic, may be used without departing from the scope of the present disclosure.

The pending order module 210 may, in various embodiments, limit the volume of order resubmissions to the order processing system 112. For example, the pending order module 210 may limit the number of orders to between 50-200 resubmissions per hour. One example may be 100 resubmissions per hour. In embodiments, the pending order module 210 may throttle back or increase the volume of orders submitted, such as based on measured order processing times or other metrics. This may prevent overloading the order processing system 112, such as when it is in a fragile state, or when it has recently been brought back online from a down condition or maintenance state. The pending order module 210 may also wait to re-submit orders until after determining that the order processing system 112 is in an online state—such as after detecting that the order processing system 112 is no longer in a maintenance state—thereby avoiding wasted resources while the order processing system 112 is known to be not processing orders. The pending order module 210 may also re-submit the orders to a backup order processing system, such as on a first resubmission attempt or after a certain number of failed attempts.

In conventional e-commerce systems, an order failure would result in a lost order. But various embodiments of the present disclosure enable the order to be recovered by re-submitting the orders when the order processing system 112 is not suffering an outage. It therefore enables the online transaction system 102 to take orders from users even if the order processing system 112 is out of order.

Figure 2D:
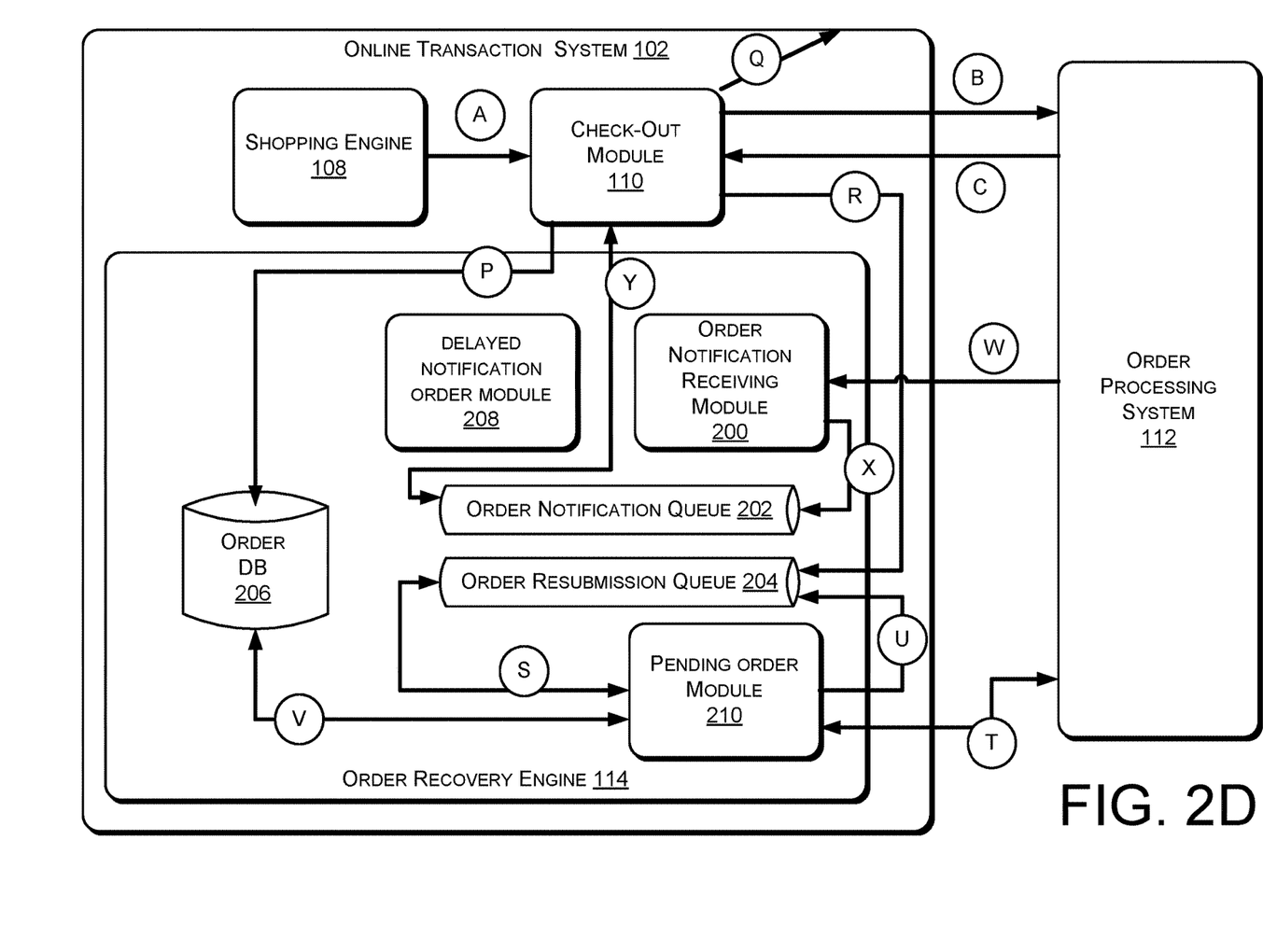
FIG. 2D illustrates a block diagram of an example online transaction system with an order recovery engine, along with an alternate transaction flow for processing orders when the order processing system experiences errors.

FIG. 2D illustrates a block diagram of an example online transaction system 102 with an order recovery engine 114, along with an alternate transaction flow for processing orders when the order processing system experiences errors. In the transaction flow illustrated in FIG. 2D, the order processing system 112 returns an order received acknowledgment to the check-out module 110 (denoted by C). Thus, the check-out module 110 initially treats the order as being not failed. But the order processing system 112 does not successfully process the order, and returns an error notification instead of an order complete notification to the order notification receiving module 200 (denoted by W).

The order notification receiving module 200 places the error notification into the order notification queue 202 (denoted by X), and the check-out module 110 attempts to retrieve a notification regarding its pending order from the order notification queue 202 (denoted by Y). But upon retrieving the error notification from the order notification queue 202, the check-out module 110 treats the order processing as failed, and the remaining elements in the transaction flow are the same as or similar to the transaction flow (P-V) of FIG. 2C.

Example Process

Figure 3:
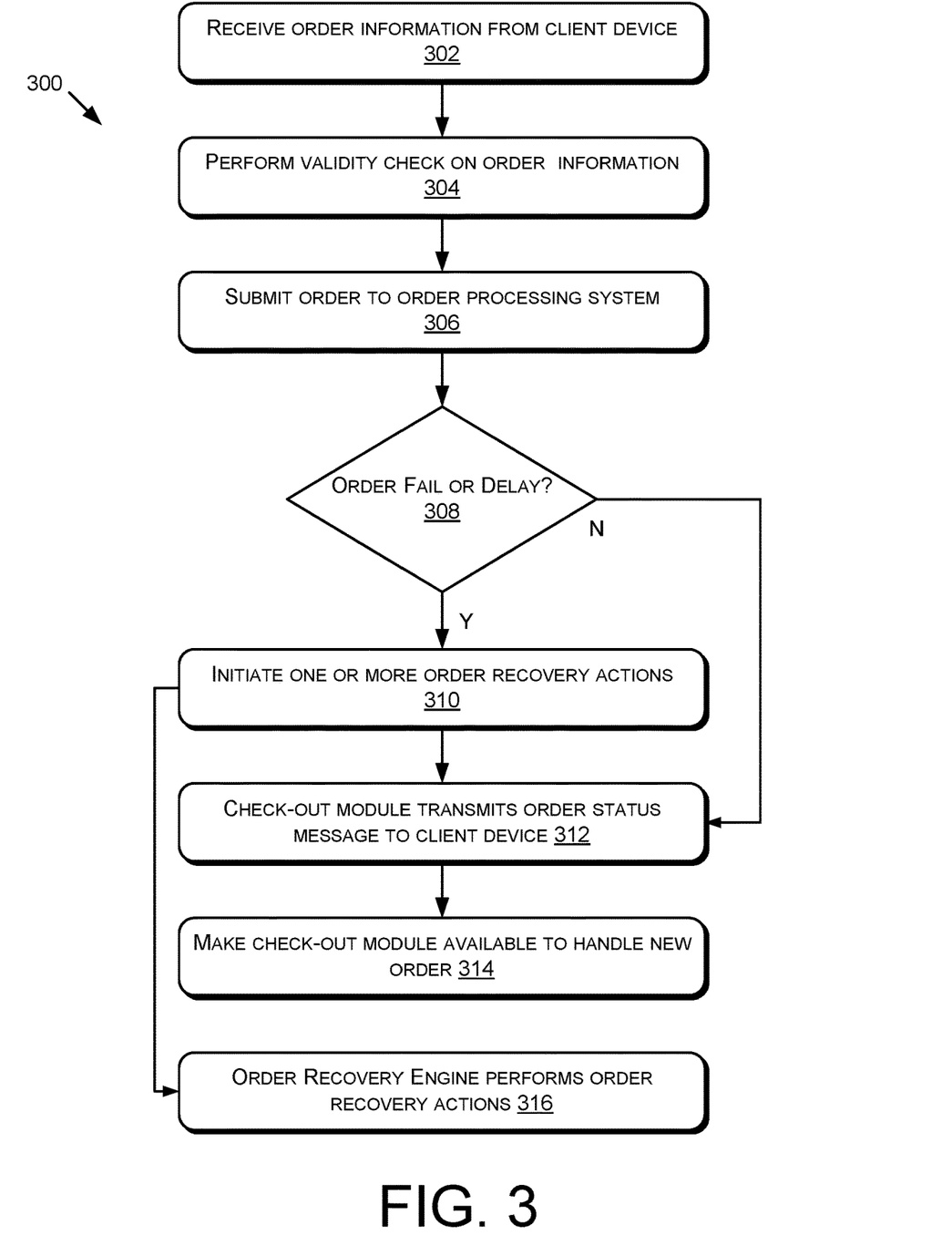
FIG. 3 illustrates a flow diagram of an example process for recovering e-commerce orders in accordance with various embodiments.

FIG. 3 illustrates a flow diagram of an example process 300 for recovering e-commerce orders in accordance with various embodiments. Although process 300 is shown as a sequential flow, it is to be understood that one or more of the steps may be performed in parallel, iteratively, or not at all in various embodiments. Various embodiments of the present disclosure may perform one or more of the steps shown in FIG. 2 by software modules or instructions executing on one or more processors, though not necessarily by discrete software modules.

At 302, an online transaction system, such as the online transaction system 102, receives order information from a client device. The order information may include various data, such as the shipping address, purchaser name, credit card information, and so forth.

At 304, a check-out module, such as the check-out module 110, performs an internal validity check on the order information, to make sure that it is sufficiently accurate and complete prior to submission. This may include doing an initial credit card check, verifying the shipping address, or other checks.

At 306, the check-out module submits the e-commerce order to an order processing system, such as the order processing system 112. And at 308, the check-out module determines whether the order processing has failed or is delayed. Determining that the order processing has failed may be based on, for example, return of an error message by the order processing system, or the expiration of a time-out waiting for an order receipt acknowledgment from the order processing system. Determining that the order processing is delayed may be based on, for example, failure to receive a notification that the order processing is complete, such as after a configurable time-out period. The order processing is delayed, and not failed, for example where the order processing system returns an order receipt acknowledgement, but fails to provide an order notification within a configurable period of time.

At 310, the check-out system initiates one or more order recovery actions. Initiating the order recovery actions may include, for example, updating an order database to indicate that the order is delayed or failed, placing the order or a resubmission order into an order resubmission queue, or other action.

At 312, the check-out module transmits a message to the client device indicating the status of the order, such as a "pending," "incomplete," "processing," "complete," or other status. In situations where the order is not complete, the message may also advise the user to return to the online transaction system at a later time to receive an update regarding his or her order. The online transaction system may also proactively submit a message to the user when the user's initially delayed or failed order is completed, such as by email, text message, or in another way.

At 314, the check-out module is made available to handle new orders.

At 316, the order recovery engine performs the order recovery actions. The order recovery actions may include, for example, waiting for receipt of an order notification (such as where the order is delayed), re-submitting orders in an order resubmission queue, and updating an order database when the orders are complete, as are described with more detail elsewhere within this detailed Description.

Example System

Figure 4:
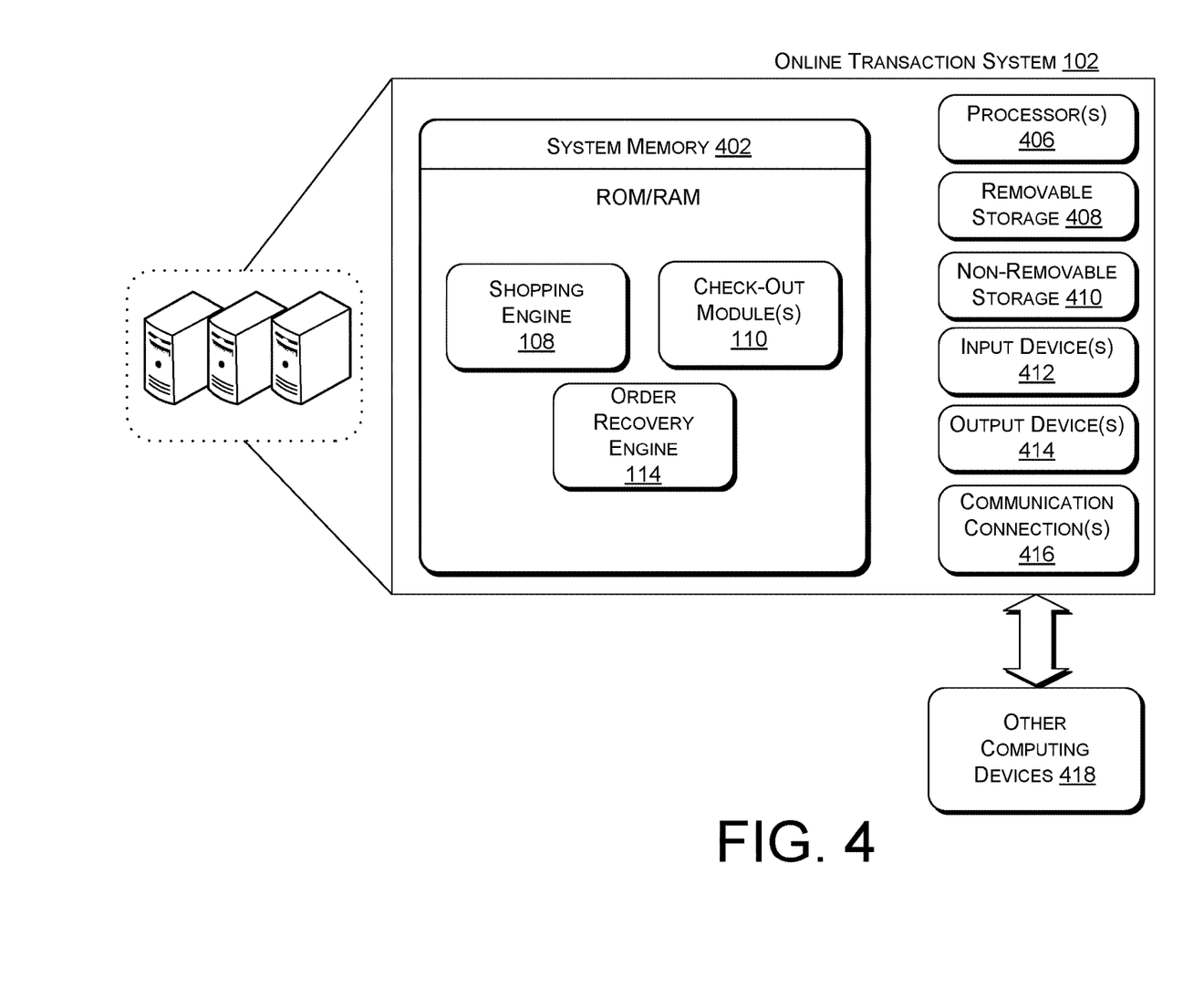
FIG. 4 illustrates an example computing device system architecture, in accordance with various embodiments.

FIG. 4 illustrates an example computing device system architecture, in accordance with various embodiments. As illustrated, the online transaction system 102 comprises a system memory 402. The system memory 402 may store the shopping engine 108, the check-out module(s) 110, and the order recovery engine 114. Also, the online transaction system 102 includes processor(s) 406, a removable storage 408 and non-removable storage 410, input device(s) 412, output device(s) 414, and communication connections 416 for communicating with other computing devices 418, such as the order processing system 112.

In various embodiments, system memory 402 is volatile memory (such as RAM), non-volatile memory (such as ROM, flash memory, etc.) or some combination of the two. Example system memory 402 may include one or more of RAM, ROM, EEPROM, a Flash Memory, a hard drive, a memory card, an optical storage, a magnetic cassette, a magnetic tape, magnetic disk storage or another magnetic storage device, or any other storage medium.

The shopping engine 108, the check-out module(s) 110, and the order recovery engine 114, shown as stored in system memory 402, are described in greater detail above. The shopping engine 108, the check-out module(s) 110, and the order recovery engine 114 may be stored on a single server, or they may be stored across multiple computing devices of a cloud service, each computing device implementing all or parts of one or more of shopping engine 108, the check-out module(s) 110, and the order recovery engine 114.

In some embodiments, the processor(s) 406 is a central processing unit (CPU), a graphics processing unit (GPU), or both CPU and GPU, or other processing unit or component known in the art.

Online transaction system 102 also includes additional data storage devices (removable and/or non-removable) such as, for example, magnetic disks, optical disks, or tape. Such additional storage is illustrated in FIG. 4 by removable storage 408 and non-removable storage 410. Computer storage media may include volatile and nonvolatile, removable and non-removable media implemented in any method or technology for storage of information, such as computer readable instructions, data structures, program modules, or other data. System memory 402, removable storage 408 and non-removable storage 410 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the online transaction system 102. Any such computer-readable storage media may be part of the online transaction system 102.

In various embodiments, any or all of system memory 402, removable storage 408, and non-removable storage 410, store programming instructions that are executable by the processor(s) 406 to implement some or all of the above-described operations of the online transaction system 102.

The online transaction system 102 also has input device(s) 412, such as a keyboard, a mouse, a touch-sensitive display, voice input device, etc., and output device(s) 414 such as a display, speakers, a printer, etc. These devices are well known in the art and need not be discussed at length here.

The online transaction system 102 also contains communication connections 416 that allow the online transaction system 102 to communicate with other computing devices 418, such as the online transaction system 102 and the client device 106.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
 submitting to an order processing system, by an order check-out module executing on one or more processors, an e-commerce order including order information provided to the order check-out module by a client device;

determining, by the order check-out module, that the order processing is delayed or failed;

determining, independent of user input and based at least on a status of the order processing being delayed or failed to perform an order recovery action;

initiating, by the check-out module, the order recovery action to be performed by an order recovery engine; and making the order check-out module available to handle a new order upon initiating the order recovery action.

2. The method as in claim 1, wherein the determining that the order processing is delayed or failed includes querying an order notification queue for notifications from the order processing system regarding the order.

3. The method as in claim 1, further comprising:

determining, by the order check-out module, that the order processing has failed; and placing the order into an order resubmission queue for processing at a later time.

4. The method as in claim 3, further comprising resubmitting, by the order recovery engine, the e-commerce order to the order processing system.

5. The method as in claim 3, further comprising submitting, by the order recovery engine and to the order processing system, a message upon a determination that the order processing system has returned from an out of service condition.

6. The method as in claim 1, wherein the determining that the order processing is delayed or failed includes determining that an order receipt acknowledgement from the order processing system has not been received within a particular time-out period.

7. The method as in claim 1, further comprising:

determining, by the order check-out module, that the order processing has been delayed;

updating an order database to reflect that the processing of the order has been delayed; and checking, by the order recovery engine, an order notification queue for a notification regarding the order based at least on the order database indicating that the processing of the order is delayed.

8. The method as in claim 1, further comprising transmitting, by the check-out module and based at least on a status of the order processing being delayed or failed, a message to the client device indicating that the status of the order is pending.

9. A system, comprising:

one or more processors; and a physical computer-readable memory having stored thereon instructions that, when executed by the one or more processors cause the system to implement:

a check-out module to:

receive order information from a client device;

submit an order including the order information to an order processing system;

determine that a status of processing of the order by the order processing system has failed or been delayed;

determine, independent of user input and based upon the determination that the status of processing of the order has failed or been delayed, to instruct an order recovery engine to perform an action; and instruct the order recovery engine to perform the action, wherein the action includes to handle subsequent messages from the order processing system associated with the order.

10. The system of claim 9, wherein the order recovery engine further includes an order notification receiving module executable by the one or more processors to receive order notifications from the order processing system, and wherein the check-out module is further executable to determine the status of processing the order based at least on receipt, or lack of receipt, by the order notification receiving module of an order notification regarding the order.

11. The system of claim 9, wherein the check-out module is further executable to determine the status of processing the order based at least on failure of the order processing system to provide a receipt acknowledgment of the order within a predetermined time-out period.

12. The system of claim 9, wherein the check-out module is further executable to initiate one or more recovery actions and make itself available to handle a new order upon initiating one or more order recovery actions.

13. The system of claim 12, wherein the check-out module is further executable to initiate the one or more order recovery actions by placing the order, or a resubmission order, into an order resubmission queue, and wherein the order recovery engine is further executable to check the resubmission queue for pending orders and to re-submit the order, or the resubmission order, to the order processing system.

14. The system of claim 12, wherein the check-out module is further executable to initiate the one or more order recovery actions by updating an order database to indicate that the order processing is delayed, and wherein the order recovery engine is further executable to check an order notification queue and to update the order database upon determining that the order notification queue includes a notification that the order processing is complete.

15. One or more non-transitory computer storage media comprising computer-executable instructions stored thereon that are executable by one or more processors of a computing system to:

determine that processing of an order submitted to an order processing system by a check-out module is delayed or failed;

make the check-out module available to handle a new order upon the determination that the processing of the order is delayed or failed;

determine, independent of user input, to perform one or more order recovery actions on the order; and perform, by an order recovery engine, the one or more order recovery actions on the order.

16. The one or more computer storage media of claim 15, wherein the processing the order is delayed, and wherein the one or more order recovery actions include:

receipt of a notification that the order processing is complete; and updating an order database to reflect that the order processing is complete.

17. The one or more computer storage media of claim 15, wherein the one or more order recovery actions include:

determining that the order is designated for resubmission; and resubmitting the order, or resubmission order, to the order processing system.

18. The one or more computer storage media of claim 15, wherein the computer-executable instructions are further executable to determine that the processing of the order is delayed based on receipt of an order acknowledgement from the order processing system and a lack of receipt of notification regarding completion of the order processing within a configurable time-out period.

19. The one or more computer storage media of claim 15, wherein the computer-executable instructions are further executable to determine that the processing of the order is failed based on one of receipt of an error message from the order processing system or a time-out in receiving an acknowledgement of order receipt from the order processing system.

20. The one or more computer storage media of claim 15, wherein the computer-executable instructions are further executable to transmit, based on the determination that the processing of the order is delayed or failed, a message to a client device that initiated the order indicating that the order is pending and to return at a later time to check on a status of the order.

* * * * *